US012583072B1

(12) United States Patent
Guo et al.

(10) Patent No.: US 12,583,072 B1
(45) Date of Patent: Mar. 24, 2026

(54) FAULT DETECTION METHOD AND SYSTEM BASED ON ADAPTER TOOL SHANK

(71) Applicant: IDQ Science and Technology (Guangdong, Hengqin) Co., Ltd., Zhuhai (CN)

(72) Inventors: Dawei Guo, Zhuhai (CN); Qian Qiao, Zhuhai (CN); Ying Pan, Zhuhai (CN); Lapmou Tam, Zhuhai (CN)

( * ) Notice: Subject to any disclaimer, the term of this patent is extended or adjusted under 35 U.S.C. 154(b) by 0 days.

(21) Appl. No.: 19/266,104

(22) Filed: Jul. 10, 2025

Related U.S. Application Data

(63) Continuation of application No. PCT/CN2025/087999, filed on Apr. 9, 2025.

(30) Foreign Application Priority Data

Mar. 3, 2025 (CN) .......................... 202510243561.2

(51) Int. Cl.
*B23Q 17/00* (2006.01)
*G01D 5/14* (2006.01)

(52) U.S. Cl.
CPC ............. *B23Q 17/003* (2013.01); *G01D 5/14* (2013.01)

(58) Field of Classification Search
None
See application file for complete search history.

(56) References Cited

FOREIGN PATENT DOCUMENTS

CN 114509991 A * 5/2022 ........... G05B 19/401
CN 114905336 A * 8/2022 ........... B23Q 17/098

OTHER PUBLICATIONS

English machine translation of Zhang et al. (CN 114905336 A) (Year: 2022).*
English machine translation of Lin et al. (CN 114509991 A) (Year: 2022).*

* cited by examiner

*Primary Examiner* — Walter L Lindsay, Jr.
*Assistant Examiner* — Geoffrey T Evans

(57) ABSTRACT

The present invention provides a fault detection method and system based on an adapter tool shank and relates to the technical field of fault diagnosis of mechanical equipment. The method includes: obtaining a displacement signal of the adapter tool shank; based on the displacement signal, determining a feed rate; based on the feed rate, building a cutting force model; based on the cutting force model, building a disturbance model; building an observer model; based on the disturbance model and the observer model, determining a cutting force error; based on the observer model, determining a wear rate of the adapter tool shank; combining the cutting force error and the wear rate to perform fault detection; and based on a fault detection result, judging whether the adapter tool shank is faulted. The present invention improves the efficiency of fault diagnosis, reduces the maintenance cost, and improves the production efficiency.

9 Claims, 2 Drawing Sheets

FAULT DETECTION METHOD AND SYSTEM BASED ON ADAPTER TOOL SHANK

CROSS-REFERENCE TO RELATED APPLICATIONS

The present application is a continuation of International Application No. PCT/CN2025/087999, filed on Apr. 9, 2025, and claims priority to Chinese Patent Application No. 202510243561. 2, filed on Mar. 3, 2025, the entire disclosure of which is incorporated herein by reference.

TECHNICAL FIELD

The present invention relates to the technical field of fault diagnosis of mechanical equipment, and in particular, to a fault detection method and system based on an adapter tool shank.

BACKGROUND

A fault detection method based on an adapter tool shank is a technology for detecting and diagnosing possible faults or anomalies in a mechanical system in real time by monitoring dynamic behaviors and status changes of the adapter tool shank. By installing sensor on the adapter tool shank to monitor its displacement, temperature, vibration and other signals, feature data related to a fault can be obtained. The sensor data are analyzed, such that the type and degree of the fault of the adapter tool shank can be identified, and alarms or preventive maintenance are timely performed, thereby improving the stability of the machining process and production efficiency.

The adapter tool shank plays a key role in connecting a tool and a spindle in the machining process, and the working condition of the adapter tool shank directly affects the machining quality and accuracy. Over an extended period of use, the adapter tool shank may experience wear, deformation, or other faults, which often lead to inaccurate tool positioning, an unstable cutting force, and even equipment damage. Therefore, a method is needed to capture potential fault information in real time and issue an early warning to avoid further deterioration thereby reducing production downtime, lowering the maintenance cost, and ensuring the high efficiency of production and the safety of the device.

However, a traditional fault detection technology usually relies on regular monitoring or manual inspection, which cannot respond to changes in system status in real time and may result in a shutdown or more extensive damage. The process of fault detection mainly relies on manual experience and manual intervention to judge occurrence of faults, which is highly subjective and easily affected by experience of an operator and thus misses some small but important fault signs, leading to excessively low accuracy and rate of fault detection.

SUMMARY OF THE INVENTION

In order to solve the technical problems that a traditional fault detection technology usually relies on regular monitoring or manual inspection, which cannot respond to changes in system status in real time and may result in a shutdown or more extensive damage, and the process of fault detection mainly relies on manual experience and manual intervention to judge occurrence of faults, which is highly subjective and easily affected by experience of an operator and thus misses some small but important fault signs, leading to excessively low accuracy and rate of fault detection, the present invention provides a fault detection method and system based on an adapter tool shank.

The technical solutions provided by the embodiments of the present invention are as follows.

In a first aspect, a fault detection method based on an adapter tool shank according to an embodiment of the present invention includes:

S1: obtaining a displacement signal of the adapter tool shank;

S2: based on the displacement signal, determining a feed rate;

S3: based on the feed rate, building a cutting force model;

S4: based on the cutting force model, building a disturbance model; S5: building an observer model;

S6: based on the disturbance model and the observer model, determining a cutting force error;

S7: based on the observer model, determining a wear rate of the adapter tool shank;

S8: combining the cutting force error and the wear rate for fault detection; and S9: based on a fault detection result, judging whether the adapter tool shank has faulted, wherein if yes, a genetic algorithm is used to adjust the parameters of the adapter tool shank; otherwise, a return is made to step S1.

In a second aspect, a fault detection system based on an adapter tool shank according to an embodiment of the present invention includes:

a processor; and a memory having computer readable instructions stored thereon, where the computer readable instructions, when executed by the processor, implement the fault detection method based on the adapter tool shank according to the first aspect.

In a third aspect, a computer-readable storage medium according to an embodiment of the present invention has a computer program stored thereon, where the program, when executed by a processor, implements the fault detection method based on the adapter tool shank according to the first aspect.

The technical solutions provided in the embodiments of the present invention have at least the following beneficial effects.

In the embodiments of the present invention, by building the cutting force model and the disturbance model, the influence of the feed rate on a cutting force is accurately described, and fluctuations in an actual machining environment are simulated, such that small changes of a device are better captured, thereby enhancing the adaptability and reliability of fault detection to cope with the variable machining environment. By building the observer model, the system status is estimated, such that relevant key parameters can be accurately inferred without directly measuring certain variables, thereby improving the efficiency of fault diagnosis. Combined with a comprehensive analysis on the cutting force error and wear rate, a fault of the device can be accurately identified, thereby enhancing the robustness and accuracy of fault detection and reducing the risks of false positives and false negatives. When the fault occurs, the parameters of the device are automatically adjusted through a genetic algorithm, thereby avoiding further damage to the device, reducing the maintenance cost and improving the production efficiency.

BRIEF DESCRIPTION OF THE DRAWINGS

To describe the technical solutions in the embodiments of the present invention more clearly, the drawings required to describe the embodiments are briefly described below. Apparently, the drawings described below are only some embodiments of the present invention. A person of ordinary skill in the art may further obtain other drawings based on these drawings without creative efforts.

DETAILED DESCRIPTION OF THE EMBODIMENTS

The technical solutions in the present invention will be described below with reference to the drawings.

In the embodiments of the present invention, terms such as "exemplarily" and "for example" are used to indicate an example, an illustration or an explanation. Any embodiment or design described herein as "exemplary" is not necessarily to be construed as preferred or advantageous over other embodiments or designs. Rather, the term "exemplary" is used to specifically present the concept. In addition, in the embodiments of the present invention, the meaning conveyed by "and/or" may be both, or may be either.

In the embodiments of the present invention, "image" and "picture" may sometimes be used interchangeably, and it is to be pointed out that the intended meaning of "image" and "picture" is the same when the difference is not emphasized. "Of", "corresponding/relevant" and "corresponding" may sometimes be used interchangeably, and it is to be pointed out that the intended meaning of "of", "corresponding/relevant" and "corresponding" is the same when the difference is not emphasized.

In the embodiments of the present invention, a subscript, e.g., $W_1$ may sometimes be written in a non-subscript form, e.g., W1. The intended meaning of "$W_1$" and "W1" is the same when the difference is not emphasized.

To make the technical problems to be solved, technical solutions and advantages of the present invention clearer, a detailed description will be made with reference to the drawings and specific embodiments.

Figure 1:
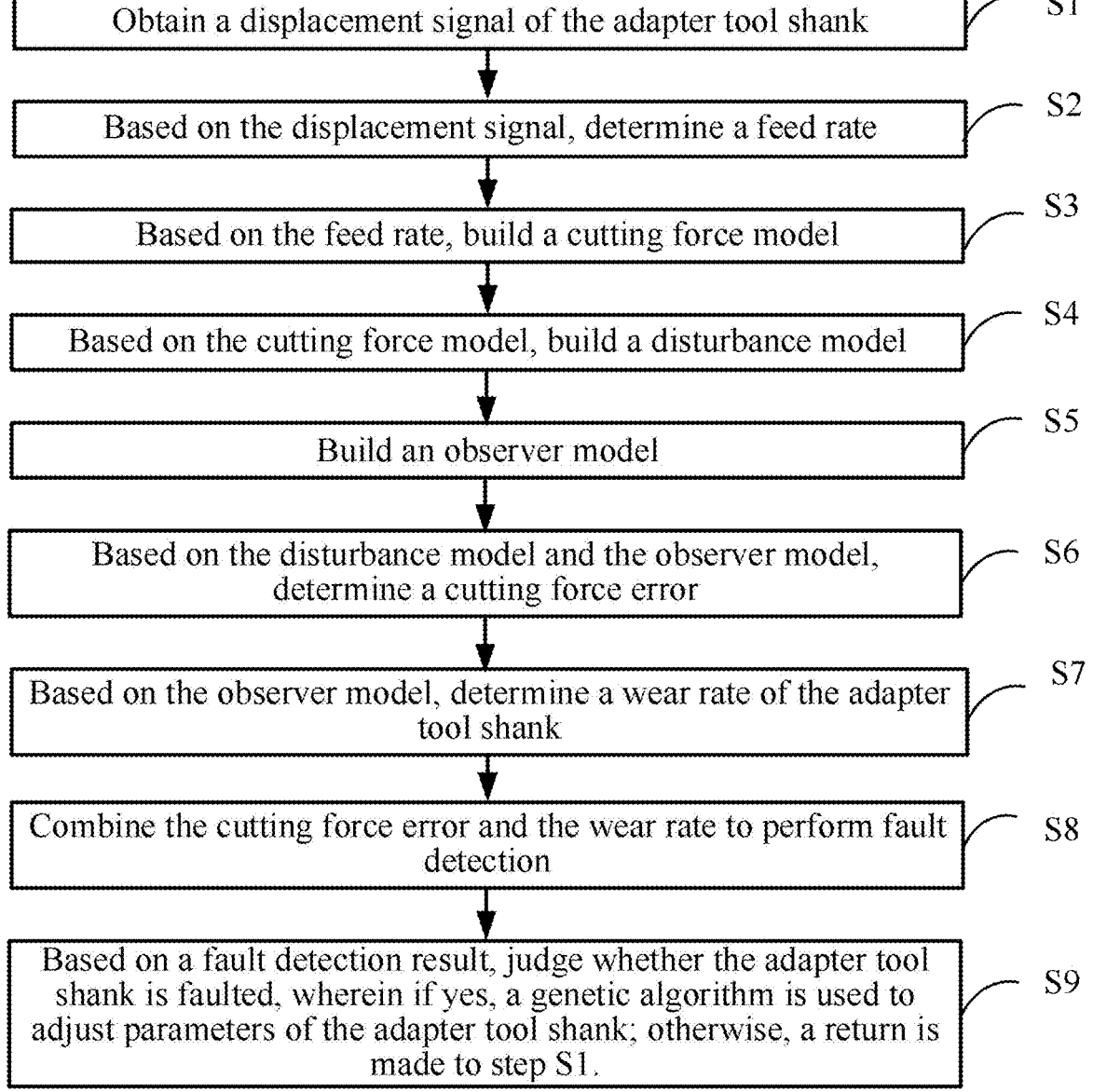
FIG. 1 is a schematic flow diagram of a fault detection method based on an adapter tool shank according to an embodiment of the present invention.

Reference is made to FIG. 1 in the description, which is a schematic flow diagram of a fault detection method based on an adapter tool shank according to an embodiment of the present invention.

The embodiment of the present invention provides a fault detection method based on an adapter tool shank. The method may be implemented by a fault detection device based on the adapter tool shank. The fault detection device based on the adapter tool shank may be a terminal or a server. The processing flow of the fault detection method based on the adapter tool shank may include the following steps.

S1: Obtain a displacement signal of the adapter tool shank.

The adapter tool shank is an apparatus for connecting a cutting tool and a machine tool spindle and can guarantee that the tool is stably fixed on the spindle in the machining process. Therefore, the performance of the adapter tool shank directly affects the machining accuracy and the service life of the tool. The displacement signal refers to the displacement data of the adapter tool shank in the machining process obtained through a sensor, e.g., an eddy current displacement sensor. The displacement signal reflects an actual movement state of the adapter tool shank, and indirectly reflects information such as a change in cutting force in the machining process.

It is noted that obtaining the displacement signal of the adapter tool shank can monitor the operating status of a device in real time, accurately understand a displacement situation of the adapter tool shank, and timely discover anomalies and minor faults to ensure the stability of the machining process, as well as can obtain dynamic feedback without interrupting production, thereby effectively improving fault early warning and the maintenance efficiency.

In a possible implementation, in S1, specifically,
the displacement signal is obtained through a plurality of eddy current displacement sensors.

The eddy current displacement sensor is a sensor that measures a position or displacement of an object through an eddy current effect. The displacement of the object is measured by changing the induced current through the interaction between an electromagnetic field emitted by the sensor and the object being measured.

S2: Based on the displacement signal, determine a feed rate.

The feed rate is a speed at which the tool or a workpiece moves along a given direction. In the machining process, the feed rate decides a cutting speed and a material removal rate.

It is noted that determining the feed rate through the displacement signal can accurately track a motion state of the tool or the adapter tool shank in real time to avoid delays and errors of a traditional method, as well as can dynamically adjust the feed rate to cope with possible changes in the machining process, thereby improving the machining accuracy and reducing device wear.

In a possible implementation, S2 specifically includes the following steps.

S201: Based on the displacement signal, build a displacement signal model:

$$S_1(\theta)=G[R_1-r(\theta)-\Delta x]$$

$$S_2(\theta)=G[R_2-r(\theta+\pi)+\Delta x]$$

where both $S_1$ and $S_2$ represent sensors in a radial direction of the adapter tool shank, $S_1(\theta)$ represents a displacement signal of the displacement sensor $S_1$ in a case that the adapter tool shank is rotated by $\theta$, $S_2(\theta)$ represents a displacement signal of the displacement sensor $S_2$ in a case that the adapter tool shank is rotated by $\theta$, G represents a sensitivity of the sensors, $R_1$ represents a distance from the sensor $S_1$ to a center of the adapter tool shank, $R_2$ represents a distance from the sensor $S_2$ to the center of the adapter tool shank, r( ) represents a radial variation, $\pi$ represents pi, and $\Delta x$ represents a displacement of the adapter tool shank.

The sensitivity of the sensors represents an output variation caused by a unit input, and is usually expressed as a ratio of a voltage change to a displacement change.

S202: Based on the displacement signal model, determine a radial displacement signal of the adapter tool shank:

$$S_x(\theta) = \frac{S_2(\theta) - S_1(\theta)}{2}$$

where $S_x(\theta)$ represents a radial displacement signal in a case that the adapter tool shank is rotated by $\theta$.

S203: In a case that the displacement of the adapter tool shank is zero, determine the radial displacement signal as a reference displacement signal.

S204: Combine the radial displacement signal and the reference displacement signal to determine the displacement of the adapter tool shank:

$$\Delta x = \frac{S_x(\theta) - S_{xo}(\theta)}{G}$$

where $S_{xo}(\theta)$ represents a reference displacement signal in a case that the adapter tool shank is rotated by $\theta$.

S205: Based on the displacement of the adapter tool shank, determine the feed rate:

$$f_r = \frac{\Delta x}{\Delta t}$$

where $f_r$ represents the feed rate, and $\Delta t$ represents a duration in which the adapter tool shank is displaced by $\Delta x$.

It is noted that by calculating the radial displacement signal of the adapter tool shank, key information can be accurately extracted from the displacement signal and the feed rate can be effectively determined. By comparing with the reference displacement signal, external interference or errors are eliminated, thereby ensuring the accuracy and reliability of the feed rate. The process has high precision in the real-time monitoring and controlling process, which can improve the stability and efficiency of the machining process, thereby avoiding possible lags and errors that may exist in a traditional method.

S3: Based on the feed rate, build a cutting force model.

Building the cutting force model based on the feed rate can accurately simulate and predict a change in cutting force in the machining process. The cutting force is an important factor that affects the machining quality, tool wear and the machining accuracy. An accurate cutting force model can provide an important basis for subsequent fault detection, wear monitoring and machining optimization.

In a possible implementation, the cutting force model is specifically:

$$\ddot{F} + \xi \omega_n \dot{F} + \omega_n^2 F = K_s f_r$$

where F represents a cutting force, $\dot{F}$ represents a change rate of the cutting force, $\ddot{F}$ represents an acceleration of the cutting force, $\xi$ represents a damping coefficient, $\omega_n$ represents a natural frequency, $K_s$ represents a cutting gain, and $f_r$ represents the feed rate.

S4: Based on the cutting force model, build a disturbance model.

The disturbance model is configured to describe the deviations or fluctuations caused by external uncertainties, environmental changes or problems of the device itself of a system. In the actual machining process, in addition to the expected cutting force, the system may further be subject to various interferences, which need to be modeled and compensated by the disturbance model. The system here refers to machinery devices and a control process in the entire machining process.

It is noted that by building the disturbance model, the impact of external factors and system uncertainties on cutting force can be considered to improve the accuracy and robustness of the model, as well as can monitor and compensate dynamic changes of the device in real time, thereby guaranteeing the stability in the machining process, reducing errors caused by disturbances and improving the accuracy of fault detection and early warning.

In a possible implementation, S4 specifically includes the following steps.

S401: Convert the cutting force model into a state space form:

$$\dot{x} = Ax + bu$$
$$y = C^T x$$
$$x = [F, \dot{F}]^T$$
$$u = f_r$$
$$A = \begin{bmatrix} 0 & 1 \\ -\omega_n^2 & -\zeta \omega_n \end{bmatrix}$$
$$C = [1 \quad 0]^T$$

where $\dot{x}$ represents a state change rate of the system, A represents a state transition matrix of the system, x represents a state of the system, b represents an input matrix, u represents an input vector, y represents a system output, C represents an output matrix, and $^T$ represents a transpose operation.

Specifically, x represents a state variable of the system and usually contains key parameters for describing the system behaviors, such as a cutting force and wear. The input matrix b represents the impact of a system input on the state variable and describes how an input signal (e.g., a feed rate) affects the state of the system. The output matrix C represents the relationship between the state of the system and an output as a linear mapping.

S402: Based on the cutting force model in the state space form, build the disturbance model:

$$\dot{x} = (A + \Delta A)x + (b + \Delta b)u + d$$
$$y = C^T x$$
$$\Delta A = \begin{bmatrix} 0 & 1 \\ -\Delta a_1(t) & -\Delta a_2(t) \end{bmatrix}$$
$$\Delta b = \begin{bmatrix} 0 \\ \Delta b_1(t) \end{bmatrix}$$

where $\Delta A$ represents a system matrix disturbance, $\Delta b$ represents an input matrix disturbance, d represents a bounded disturbance, both $\Delta a_1(t)$ and $\Delta a_2(t)$ represent disturbance parameters related to a cutting duration t, and $\Delta b_1(t)$ represents a disturbance term of the input matrix. $\Delta A$ reflects changes in system dynamics caused by external or internal uncertainties.

It is noted that by converting the cutting force model into the state space form, the dynamic behaviors of the system can be expressed more clearly, thereby facilitating mathematical analysis and control design. By building the disturbance model, the impact of the uncertainties and external disturbances on the system can be considered, thereby ensuring that the system can perform effective fault detection and prevention under complicated and variable working conditions. The process can better simulate an actual situation, thereby enhancing the robustness of the system to external interference and improving the accuracy and reliability of fault diagnosis.

S5: Build an observer model.

Specifically, the observer model is a method of deriving an internal state of the system by measuring the system output and combining with a mathematical model of the system. Even if some states cannot be measured directly, the observer model can estimate the state of the system based on other available output information. Building the observer model can estimate the internal state of the system. Through the input and output information of the system, the behaviors of the system can be monitored and predicted in real time, thereby improving the accuracy and timeliness of fault diagnosis. The introduction of the observer model makes the fault detection process more reliable and comprehensive, thereby reducing the reliance on expensive or complex sensors, reducing the cost and improving the stability of the system.

In a possible implementation, the observer model is specifically:

$$\begin{cases} \dot{\hat{x}} = A\hat{x} + bu + K(y - C^T\hat{x}) \\ \hat{y} = C^T\hat{x} \end{cases}$$

$$\hat{x} = [\hat{x}_1, \hat{x}_2]^T$$

$$K = [k_1, k_2, \ldots, k_n]^T$$

where $\dot{\hat{x}}$ represents a change rate of a system state estimation, $\hat{x}$ represents the system state estimation, K represents an observer gain matrix, $\hat{y}$ represents an output estimation of the system, $k_j$ represents an element of the observer gain matrix, $j=1, 2, \ldots, n$ and n represents a total number of elements of the observer gain matrix.

S6: Based on the disturbance model and the observer model, determine a cutting force error.

The cutting force error refers to a difference between a cutting force estimated through the observer model and an actual cutting force, reflects a deviation in the cutting process, and is usually used to evaluate the performance and faults of the system.

It is noted that by combining the disturbance model and the observer model to calculate the cutting force error, the changes in the cutting force in the machining process can be monitored in real time and accurately judged, avoiding the problem that a traditional method cannot effectively captured small changes, improving the sensitivity of fault detection, and timely finding deviations or anomalies of the device, thus optimizing machining parameters and reducing machining errors and tool wear, and thus improving the production efficiency and the stability of the device.

In a possible implementation, the cutting force error is specifically:

$$e = y - C^T\hat{x}$$

where e represents the cutting force error.

In the present invention, a state estimation error is defined as $\tilde{x} = x - \hat{x}$, and an output estimation error is defined as $\tilde{y} = y - \hat{y}$. Then, an error dynamic equation is:

$$\begin{cases} \dot{\tilde{x}} = (A - KC^T)\tilde{x} + \Delta Ax + \Delta bu + d \\ \tilde{y} = C^T\tilde{x} \end{cases}$$

where $\tilde{y}$ represents the output estimation error, $\tilde{x}$ represents the state estimation error, and $\dot{\tilde{x}}$ represents a change rate of the state estimation error.

S7: Based on the observer model, determine a wear rate of the adapter tool shank.

The wear rate of the adapter tool shank refers to a speed of wear change of the adapter tool shank caused by long-term use and the effect of the cutting force in the machining process. The wear rate is a key index for evaluating the tool performance and preventing faults.

It is noted that determining the wear rate of the adapter tool shank based on the observer model can estimate the tool wear in real time and avoid the technical problem caused by direct wear measurement. By monitoring the wear rate in real time, potential faults can be identified in advance and the machining parameters can be timely adjusted or replace the tool, thereby optimizing the production efficiency and extending the service life of the tool.

In a possible implementation, S7 specifically includes the following steps.

S701: Build a relationship model between the wear rate and the change rate of the cutting force:

$$F = F_0 + Lw$$

$$w = w_0 + \dot{w}t$$

$$F = F_0 + Lw_0 + L\dot{w}t$$

$$\dot{w} = \frac{\Delta F}{L\Delta t}$$

$$\dot{F} = L\dot{w}$$

where F represents the cutting force, $F_0$ represents an initial cutting force, i.e., a cutting force when the adapter tool shank is not worn, L represents a parameter related to a cutting condition, w represents tool wear, $w_0$ represents initial wear, t represents a duration of the cutting process, $\dot{w}$ represents the wear rate, $\Delta F$ represents a variation of the cutting force, $\Delta t$ represents a variation of time, and $\dot{F}$ represents a change rate of the cutting force.

S702: Based on the observer model, determine the change rate of the cutting force.

S703: Based on the relationship model and the change rate of the cutting force, determine the wear rate of the adapter tool shank.

It is noted that by building the relationship model between the wear rate and the change rate of the cutting force, the wear of the adapter tool shank can be estimated more accurately. The change rate of the cutting force is calculated in real time through the observer model, and the wear rate can be derived based on the mathematical relationship, such that the problem of tool wear can be discovered at an early stage.

In the present invention, an observer can estimate the change rate of the cutting force $\dot{F}$, and the wear rate $\dot{w}$ has a direct relationship with the change rate of the cutting force $\dot{F}$. Therefore, by combining the observer model and the change rate of the cutting force, the wear rate of the adapter tool shank can be determined. Since the cutting force F and the change rate thereof $\dot{F}$ are part of the system state, the change rate of the cutting force can be accurately estimated through the observer model.

S8: Combine the cutting force error and the wear rate to perform fault detection.

It is noted that combining the cutting force error and the wear rate for fault detection can comprehensively analyze abnormal situations in the machining process, identify potential faults or anomalies of the device in advance and avoid false positives or false negatives caused by a single parameter, improve the accuracy and robustness of fault detection, help optimize the machining process in real time, improve the stability of the device and reduce downtime and maintenance costs.

In a possible implementation, S8 specifically includes the following steps.

S801: Set a cutting force error threshold and a wear rate threshold.

The wear rate threshold is specifically:

$$F_T = C_1 \bar{w}$$

$$\bar{w} = \frac{\sum_{i=1}^{N} |\dot{w}(i)|}{N}$$

where $F_T$ represents the wear rate threshold, $C_1$ represents a proportionality coefficient, $\bar{w}$ represents an average wear rate, $\dot{w}(i)$ represents a wear rate of the $i^{th}$ measurement, i=1, 2, . . . , N, and N represents a total number of measurements.

The cutting force error threshold is specifically:

$$E_T = C_2 \frac{\sum_{i=1}^{N} |e(i)|}{N}$$

where $E_T$ represents the cutting force error threshold, $C_2$ represents a proportionality coefficient, and e(i) represents a cutting force error of the $i^{th}$ measurement.

S802: Judge whether the cutting force error exceeds the cutting force error threshold and whether the wear rate exceeds the wear rate threshold; if yes, the adapter tool shank is faulted; otherwise, the adapter tool shank is not faulted.

It is noted that by setting the thresholds of the cutting force error and the wear rate and making judgment, the working status of the adapter tool shank can be accurately monitored, the performance of the system can be evaluated in real time, and a fault early warning is issued in time when the cutting force or the wear rate is abnormal. By setting the thresholds, premature or late fault judgement can be avoided, and the sensitivity and stability of the system can be improved, effectively reducing the fault rate of the device and extending the life of the device.

S9: Based on a fault detection result, judge whether the adapter tool shank has a fault; if yes, a genetic algorithm is used to adjust the parameters of the adapter tool shank; otherwise, a return is made to step S1.

It is noted that based on the fault detection result, it is automatically judged whether the adapter tool shank is faulted, and the parameters are adjusted through the genetic algorithm when a fault occurs, such that self-repair and optimization of the device can be achieved. The genetic algorithm can effectively optimize control parameters, improve the machining accuracy and efficiency and avoid deficiencies of manual intervention.

In a possible implementation, using the genetic algorithm to adjust the parameters of the adapter tool shank specifically includes the following steps.

Define a fitness function:

$$\text{Fitness}(x) = w_1 \cdot \text{error}(x) + w_2 \cdot \text{wear}(x)$$

where Fitness( ) represents the fitness function, both $w_1$ and $w_2$ represent weight coefficients, error( ) represents the error of the cutting force, and wear( ) represents the wear rate.

Initialize a population.

Genetic code of each individual represents the control parameters of the adapter tool shank, e.g., the feed rate and a cutting force coefficient.

Based on the fitness function, an optimal individual from an initial population is selected through a roulette wheel selection.

The optimal individual is forced to undergo mutation judgment.

Forced mutation judgment specifically includes the following steps.

Calculate an average of fitness values of all the individuals in the entire population:

$$f_{avg} = \frac{1}{N} \sum_{i=1}^{N} f_i$$

where $f_{avg}$ represents the average of the fitness values, $f_i$ represents $i^{th}$ individual in the initial population, i=1, 2, . . . , N, N represents a total number of the individuals in the initial population.

Calculate a fitness gap:

$$\Delta f = \frac{f_{max} - f_{avg}}{f_{avg}}$$

where $\Delta f$ represents the fitness gap, and $f_{max}$ represents a fitness value of an individual with the maximum fitness value in the initial population.

Set a fitness threshold.

Judge whether the fitness gap is greater than the fitness threshold; if yes, a mutation operation is required; otherwise, the mutation operation is not required.

Based on a forced mutation judgment result, judge whether the optimal individual needs to be mutated; if yes, proceed to the next step; otherwise, the population is initialized again.

The optimal individual is subjected to a crossover operation and a mutation operation to obtain a mutant individual.

The mutation operation specifically includes the following steps.

Perform a Gaussian-uniform mutation operation on the optimal individual:

$$\Delta x_G = N(0, \sigma_G^2) \cdot e^{-\beta t}$$

$$\Delta x_U = u(-\delta, \delta)$$

$$\Delta x = \Delta x_G + \Delta x_U$$

$$x' = x + \Delta x$$

where $\Delta x_G$ represents a Gaussian mutation, $\Delta x_U$ represents a uniform distribution mutation, N( ) represents a Gaussian distribution function, u( ) represents a uniform distribution function, $\sigma_G$ represents a control amplitude of a Gaussian disturbance, e represents an exponential function, $\beta$ represents an attenuation parameter, $\delta$ represents a control amplitude of a uniform disturbance, $\Delta x$ represents an overall mutation, and x' represents the mutant individual.

Merge the mutant individual and the initial population to obtain a merged population.

Calculate fitness values of individuals in the merged population.

Judge whether a maximum number of iterations has been reached; if yes, an individual with a maximum fitness value is output; otherwise, a return is made to continue the iteration.

It is noted that by introducing forced mutation and multiple mutation strategies, the genetic algorithm can effectively avoid early convergence, improve the global searching ability, and accurately optimize the control parameters, thereby not only improving the stability of the system, but also effectively reducing the risk of faults and the maintenance cost.

The technical solutions provided in the embodiments of the present invention have at least the following beneficial effects.

In the embodiments of the present invention, by building the cutting force model and the disturbance model, the influence of the feed rate on a cutting force is accurately described, and fluctuations in an actual machining environment are simulated, such that small changes of a device are better captured, thereby enhancing the adaptability and reliability of fault detection to cope with the variable machining environment. By building the observer model, the system status is estimated, such that relevant key parameters can be accurately inferred without directly measuring certain variables, thereby improving the efficiency of fault diagnosis. Combined with a comprehensive analysis of cutting force error and the wear rate, a fault of the device can be accurately identified, thereby enhancing the robustness and accuracy of fault detection and reducing risks of false positives and false negatives. When the fault occurs, the parameters of the device are automatically adjusted through a genetic algorithm, thereby avoiding further damage to the device, reducing the maintenance cost and improving the production efficiency.

Figure 2:
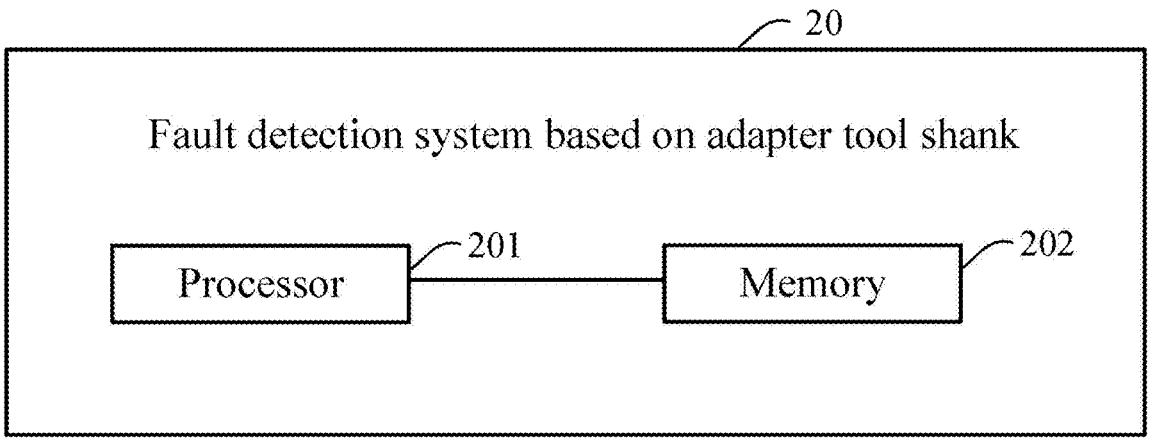
FIG. 2 is a schematic structural diagram of a fault detection system based on the adapter tool shank according to an embodiment of the present invention.

Refer to FIG. 2 in the description, which shows a schematic structural diagram of a fault detection system based on an adapter tool shank according to the present invention.

The present invention further provides a fault detection system 20 based on an adapter tool shank, which is applied to the above-mentioned fault detection method based on the adapter tool shank. The fault detection system includes:

a processor 201; and a memory 202 having computer readable instructions stored thereon, where the computer readable instructions, when executed by the processor 201, implement the fault detection method based on the adapter tool shank according to the method embodiments.

The fault detection system 20 based on the adapter tool shank according to the present invention can perform the above-mentioned fault detection method based on the adapter tool shank and implement the same or similar technical effects. To avoid repetition, details will not be described herein.

The technical solutions provided in the embodiments of the present invention have at least the following beneficial effects.

In the embodiments of the present invention, by building the cutting force model and the disturbance model, the influence of the feed rate on a cutting force is accurately described, and fluctuations in an actual machining environment are simulated, such that small changes of a device are better captured, thereby enhancing the adaptability and reliability of fault detection to cope with the variable machining environment. By building the observer model, the system status is estimated, such that relevant key parameters can be accurately inferred without directly measuring certain variables, thereby improving the efficiency of fault diagnosis. Combined with a comprehensive analysis of cutting force error and the wear rate, a fault of the device can be accurately identified, thereby enhancing the robustness and accuracy of fault detection and reducing risks of false positives and false negatives. When the fault occurs, the parameters of the device are automatically adjusted through a genetic algorithm, thereby avoiding further damage to the device, reducing the maintenance cost and improving the production efficiency.

It is to be understood that the processor in the embodiment of the present invention may be a central processing unit (CPU). The processor may further be other general-purpose processors, a digital signal processor (DSP), an application specific integrated circuit (ASIC), a field programmable gate array (FPGA), or another programmable logic device, discrete gate or transistor logic device, discrete hardware component, etc. The general-purpose processor may be a microprocessor, or any conventional processor, etc.

It is also to be understood that the memory in the embodiment of the present invention may be a volatile memory or a non-volatile memory or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, random access memories (RAMs) in many forms, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM), are available.

The foregoing embodiments may be entirely or partially implemented through software, hardware (e.g., a circuit), firmware, or any other combinations. When the software is used for implementation, the foregoing embodiments may be entirely or partially implemented in the form of a computer program product. The computer program product includes one or more computer instructions or a computer program. When the computer instructions or the computer program is loaded or executed on a computer, all or part of the process or functions according to the embodiments of the present invention are generated. The computer may be a general-purpose computer, a special purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (e.g., infrared, wireless or microwave) manner. The computer-readable storage medium may be any available medium capable of being accessed by the computer or a data storage device integrated by one or more available media, such as a server and a data center. The available medium may be a magnetic medium (e.g., a soft disk, a hard disk, and a magnetic tape), an optical medium (e.g., a DVD), or a semiconductor medium. The semiconductor medium may be a solid-state disk.

It is to be understood that the term "and/or" herein indicates merely a relationship for describing the related items, and represents three possible relationships. For example, "A and/or B" may represent the following three circumstances: A alone, both A and B, and B alone. A and B may be singular or plural. In addition, the character "/" herein generally represents an "or" relationship of the successively related items. And it may also represent a "and/or" relationship. For details, reference may be made to the context for understanding.

In the present invention, "at least one" refers to one or more, and "a plurality of" refers to two or more. "at least one of the following items" or a similar expression thereof refers to any combination of these items, including any combination of a single item or multiple items. For example, "at least one of a, b and c" may represent: a, b, c, a-b, a-c, b-c, or a-b-c, where a, b and c may be single or multiple.

It is to be understood that in various embodiments of the present invention, the magnitude of the serial number of each of the foregoing processes does not mean a sequence of the order of execution, and the order of execution of each process should be determined by its function and inherent logic without constituting any limitation on the implementation processes of the embodiments of the present application.

A person of ordinary skill in the art may notice that the exemplary units and algorithm steps described with reference to the embodiments disclosed herein can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of the present invention.

A person skilled in the art may clearly understand that for the convenience and brevity of the description, for a specific working process of the device, apparatus and unit described above, reference may be made to the corresponding process in the foregoing method embodiments. Details will not be described herein.

In the several embodiments provided in the present invention, it is to be understood that the disclosed device, apparatus and method may be implemented in other manners. For example, the foregoing described apparatus embodiments are merely examples. For example, the unit division is merely logical function division and there may be other division manners in actual implementation. For example, multiple units or components may be combined or integrated into another device, or some features may be omitted or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and components displayed as units may or may not be physical units, that is, may be located in one position, or may be distributed on a plurality of network units. Some or all of the units may be selected according to actual needs to achieve objectives of the solutions of the embodiments.

In addition, functional units in the embodiments of the present invention may be integrated into one processing unit, or each of the units may be physically separated, or two or more units may be integrated into one unit.

In a case that the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be presented in the form of a software product. The computer software product is stored in a storage medium, and includes several instructions for causing one or more computer devices (which may be a personal computer, a server, a network device, or the like) to perform all or some of the steps of the methods described in the embodiments of the present invention. And the foregoing storage medium includes: various media that can store program code, such as a U disk, a mobile hard disk, a read-only memory (ROM), a random access memory (RAM), a diskette, or an optical disk.

An embodiment of the present invention provides a computer-readable storage medium having a computer program stored thereon. The program, when executed by a processor, implements the fault detection method based on the adapter tool shank according to the method embodiments.

The computer-readable storage medium according to the present invention can achieve the steps and effects of the fault detection method based on the adapter tool shank according to the above-mentioned method embodiments. To avoid repetition, details will not be described herein.

The technical solutions provided in the embodiments of the present invention have at least the following beneficial effects.

In the embodiments of the present invention, by building the cutting force model and the disturbance model, the influence of the feed rate on a cutting force is accurately described, and fluctuations in an actual machining environment are simulated, such that small changes of a device are better captured, thereby enhancing the adaptability and reliability of fault detection to cope with the variable machining environment. By building the observer model, the system status is estimated, such that relevant key parameters can be accurately inferred without directly measuring certain variables, thereby improving the efficiency of fault diagnosis. Combined with a comprehensive analysis of cutting force error and the wear rate, a fault of the device can be accurately identified, thereby enhancing the robustness and accuracy of fault detection and reducing risks of false positives and false negatives. When the fault occurs, the parameters of the device are automatically adjusted through a genetic algorithm, thereby avoiding further damage to the device, reducing the maintenance cost and improving the production efficiency.

The above descriptions are only specific implementations of the present invention, and the protection scope of the present invention is not limited thereto. Any changes or substitutions that are readily conceivable to a person skilled in the art within the technical scope disclosed in the present invention should all be included within the protection scope of the present invention. Therefore, the protection scope of the present invention should be subject to the protection scope of the claims.

The following points need to be explained:

(1) The drawings of the embodiments of the present invention only involve the structures involved in the embodiments of the present invention. For other structures, reference may be made to general designs.

(2) For the sake of clarity, in the drawings for describing the embodiments of the present invention, layers or regions are magnified or downscaled. That is, these drawings are not drawn to an actual scale. It can be understood that when an element such as layer, film, region or substrate is referred to as being located "above" or "below" another element, the element may be "directly" located "above" or "below" the another element, or there may be an intermediate element.

(3) The embodiments of the present invention and features in the embodiments may be mutually combined to obtain a new embodiment as long as there is no conflict.

The above descriptions are only specific implementations of the present invention, and the protection scope of the present invention is not limited thereto. The protection scope of the present invention should be subject to the protection scope of the claims.

What is claimed is:

1. A fault detection method based on an adapter tool shank, characterized in that, comprising:

S1: obtaining a displacement signal of the adapter tool shank;

S2: based on the displacement signal, determining a feed rate;

S3: based on the feed rate, building a cutting force model;

S4: based on the cutting force model, building a disturbance model;

S5: building an observer model;

S6: based on the disturbance model and the observer model, determining a cutting force error;

S7: based on the observer model, determining a wear rate of the adapter tool shank;

S8: combining the cutting force error and the wear rate to perform fault detection; and S9: based on a fault detection result, judging whether the adapter tool shank has a fault, wherein if yes, a genetic algorithm is used to adjust parameters of the adapter tool shank; otherwise, a return is made to step S1;

wherein the S7 specifically comprises:

S701: building a relationship model between the wear rate and a change rate of a cutting force;

S702: based on the observer model, determining the change rate of the cutting force;

S703: based on the relationship model and the change rate of the cutting force, determining the wear rate of the adapter tool shank.

2. The fault detection method based on the adapter tool shank according to claim 1, characterized in that in step S1, specifically, the displacement signal is obtained through a plurality of eddy current displacement sensors.

3. The fault detection method based on the adapter tool shank according to claim 1, characterized in that the S2 specifically comprises:

S201: based on the displacement signal, building a displacement signal model:

$$S_1(\theta)=G[R_1-r(\theta)-\Delta x]$$

$$S_2(\theta)=G[R_2-r(\theta+\pi)+\Delta x]$$

wherein both $S_1$ and $S_2$ represent sensors in a radial direction of the adapter tool shank, $S_1(\theta)$ represents a displacement signal of the displacement sensor S in a case that the adapter tool shank is rotated by $\theta$, $S_2(\theta)$ represents a displacement signal of the displacement sensor $S_2$ in a case that the adapter tool shank is rotated by $\theta$, G represents a sensitivity of the sensors, $R_1$ represents a distance from the sensor $S_1$ to a center of the adapter tool shank, $R_2$ represents a distance from the sensor $S_2$ to the center of the adapter tool shank, r( ) represents a radial variation, $\pi$ represents pi, and $\Delta x$ represents a displacement of the adapter tool shank;

S202: based on the displacement signal model, determining a radial displacement signal of the adapter tool shank:

$$S_x(\theta) = \frac{S_2(\theta) - S_1(\theta)}{2}$$

wherein $S_x(\theta)$ represents a radial displacement signal in a case that the adapter tool shank is rotated by $\theta$;

S203: in a case that the displacement of the adapter tool shank is zero, determining the radial displacement signal as a reference displacement signal;

S204: combining the radial displacement signal and the reference displacement signal to determine the displacement of the adapter tool shank:

$$\Delta x = \frac{S_x(\theta) - S_{xo}(\theta)}{G}$$

wherein $S_{xo}(\theta)$ represents a reference displacement signal in a case that the adapter tool shank is rotated by $\theta$;

S205: based on the displacement of the adapter tool shank, determining the feed rate.

4. The fault detection method based on the adapter tool shank according to claim 1, characterized in that the cutting force model is specifically:

$$\ddot{F}+\xi\omega_n\dot{F}+\omega_n{}^2F=K_sf_r$$

wherein F represents a cutting force, $\dot{F}$ represents a change rate of the cutting force, $\ddot{F}$ represents an acceleration of the cutting force, $\xi$ represents a damping coefficient, $\omega_n$ represents a natural frequency, $K_s$ represents a cutting gain, and $f_r$ represents the feed rate.

5. The fault detection method based on the adapter tool shank according to claim 1, characterized in that the S4 specifically comprises:

S401: converting the cutting force model into a state space form;

S402: based on the cutting force model in the state space form, building the disturbance model:

$$\dot{x} = (A + \Delta A)x + (b + \Delta b)u + d$$

$$y = C^T x$$

$$\Delta A = \begin{bmatrix} 0 & 1 \\ -\Delta a_1(t) & -\Delta a_2(t) \end{bmatrix}$$

$$\Delta b = \begin{bmatrix} 0 \\ \Delta b_1(t) \end{bmatrix}$$

wherein $\dot{x}$ represents a state change rate of a system, A represents a state transition matrix of the system, x represents a state of the system, b represents an input matrix, u represents an input vector, y represents a system output, C represents an output matrix, $^T$ represents a transpose operation, $\Delta A$ represents a system matrix disturbance, $\Delta b$ represents an input matrix disturbance, d represents a bounded disturbance, both $\Delta a_1(f)$ and $\Delta a_2(t)$ represent disturbance parameters related to a cutting duration t, and $\Delta b_1(t)$ represents a disturbance term of the input matrix.

6. The fault detection method based on the adapter tool shank according to claim 1, characterized in that the observer model is specifically:

$$\begin{cases} \dot{\hat{x}} = A\hat{x} + bu + K(y - C^T\hat{x}) \\ \hat{y} = C^T\hat{x} \end{cases}$$

$$\hat{x} = [\hat{x}_1, \hat{x}_2]^T$$

$$K = [k_1, k_2, \dots, k_n]^T$$

wherein $\dot{\hat{x}}$ represents a change rate of a system state estimation, $\hat{x}$ represents the system state estimation, K represents an observer gain matrix, $\hat{y}$ represents an output estimation of the system, $k_j$ represents a $j^{th}$ element of the observer gain matrix, j=1, 2, . . . , n, and n represents a total number of elements of the observer gain matrix.

7. The fault detection method based on the adapter tool shank according to claim 1, characterized in that the cutting force error is specifically:

$$e = y - \hat{y} = y - C^T\hat{x}$$

wherein e represents the cutting force error.

8. The fault detection method based on the adapter tool shank according to claim 1, characterized in that the S8 specifically comprises:

S801: setting a cutting force error threshold and a wear rate threshold;

S802: judging whether the cutting force error exceeds the cutting force error threshold and whether the wear rate exceeds the wear rate threshold; if yes, the adapter tool shank is faulted; otherwise, the adapter tool shank is not faulted.

9. A fault detection system based on an adapter tool shank, characterized in that, comprising:

a processor; and a memory having computer readable instructions stored thereon, wherein the computer readable instructions, when executed by the processor, implement the fault detection method based on the adapter tool shank according to claim 1.

\* \* \* \* \*